United States Patent Office 3,415,319
Patented Dec. 10, 1968

3,415,319
FLUID LOSS CONTROL OF ACIDIC SOLUTIONS
Daniel L. Gibson, Tulsa, Okla., assignor to The Dow Chemical Company, Midland, Mich., a corporation of Delaware
No Drawing. Filed Sept. 6, 1966, Ser. No. 577,158
5 Claims. (Cl. 166—33)

ABSTRACT OF THE DISCLOSURE

Acid treatment of oil- or gas-bearing formations is made more effective by incorporating, in the aqueous acid medium employed, an effective quantity of a particulated acrylamide polymer.

---

The invention herein described and claimed provides an answer to a long felt need in the art of treating earthen formations, e.g., those bearing hydrocarbonaceous fluids, with an aqueous acidic composition.

Periodically, or on occasion, fluid production from a fluid-bearing reservoir in an earthen formation penetrated by a well is sought to be stimulated. When such reservoir comprises carbonate rock, e.g., limestone, dolomite, or sandstone containing streaks or striations of such rock, an acidic composition, e.g., a 1% to 30% by weight solution of HCl, is often injected therein which chemically reacts with the carbonate content of the rock, thereby creating channels therein which lead from the recesses of the reservoir to the wellbore.

Shale sometimes present in reservoir rock or lying between such rock and a wellbore has been found to yield to treatments of HF in water or admixed with HCl in water, the latter being more commonly employed. Treatment of formations with acids is usually called acidizing and the action of the acid of the rock is often called etching. Acidizing where an acidic solution is injected at insufficient pressure to create cracks in the formation, i.e., insufficient to fracture, is usually known as matrix acidizing.

Fracturing, wherein hydraulic pressure and pumping pressure are sufficient to overcome the overburden weight and cause cracks to form in the reservoir rock (usually propped open as by sand) is commonly practiced to stimulate fluid production. Fracturing may be carried out by employing any common liquid which does not incur any undesirable incidental or side effects; such undesirable effects may be illustrated by fluids which would be harmful to equipment or dangerous to personnel. Usually water, brine, oil, or mixtures thereof are employed.

Acidizing and hydraulic fracturing are often combined by employing an acidic fluid at fracturing pressure, thereby obtaining the benefits of chemically-etched channels and pressure-created fractures.

In any well-treating process wherein a fluid is injected into a formation to create channels or fractures therein, it is desirable that the fluid be diverted from being dissipated by seeping off too rapidly into the more porous zones (where insufficient permeability is not a problem) and thereby leaving the tight (low-permeable) portions of the formation unchanged, thereby often worsening the situation by further opening up the already high permeable portions. It is likewise necessary, in carrying out a successful fracturing job, to lessen fluid loss sufficiently to provide a rise in pressure which is sufficient to cause fracturing. When the loss of fluid is high, the fluid may seep away too fast to permit sufficient pressure for adequate fractures to be created.

Attempts to overcome the undesirable loss of fluid to a formation being treated have largely consisted of admixing with the acid and/or fracturing fluid an agent which tends to plug off temporarily or lessen the flow through the existing channels and pores thereby to divert the fluid to tighter zones thus to result in acidizing and/or fracturing there. These agents are commonly known as fluid loss control agents.

A number of such agents have been found helpful for use in commonly employed non-acid fluids illustrative of which agents are those described in U.S. Patent 3,153,450 and U.S. Patent 2,779,735. However, in the presence of an acid, which inherently is required for acidizing or acid fracturing, conventional agents are attacked and undergo such degradation that their efficiency as a fluid loss control agent is greatly impaired or even destroyed.

The problem of lessening such fluid loss from acid compositions has persisted. We have now discovered that the admixture of a linear polyacrylamide polymer with an acidic or acid fracturing liquid lessens the loss of fluid to a porous formation in a highly satisfactory manner. Any of the well-known inhibitors to the corrosivity of acids to metal, e.g., compounds of nitrogen, sulfur, or arsenic compounds, for example, as described in U.S. Patents 1,877,504, 2,510,284 or 2,758,970 may be employed in the usual amounts for such purpose, e.g., between about 0.1 and about 2.0% by weight of the acidic composition. The usual propping agents may also be used, e.g., sand, glass, ground nutshell, and the like. Flint shot sand, such as Ottawa sand, of a size between 8 and 40 mesh, in an amount of between about 0.5 and 5.0 pounds per gallon of acidic composition, is suggested to be used.

The polyacrylamide polymers which can be employed are polyacrylamide homopolymer and copolymers of acrylamide with ethylenically unsaturated monomers polymerizable therewith.

Ways of preparing linear polyacrylamide polymers are well-known in general. One common way is to polymerize acrylamide in the presence of $Na_2CO_3$ employing a persulfate-type catalyst. The following procedure illustrates in some detail a method of preparing suitable polymers for practice in the invention.

Acrylamide, with or without suitable comonomers, is admixed with a chemical polymerization catalyst such as benzoyl persulfate or benzoyl peroxide; no cross-linking agent or monomer is employed. Polymerization may be carried out in water or in a water-miscible lower aliphatic alcohol wherein the alcohol is not in excess of 50% by weight. The polymerization is usually carried out at temperatures between about 40° and 80° C. The polymer so made is recovered in such known ways as evaporation of the solvent or pouring the polymerization mixture into a suitable extracting solvent, for example, a lower aliphatic alcohol in which the polymer is insoluble. The molecular weight of the polymer which can be employed is such that 0.5 weight percent solution of the polymer in a 4 weight percent aqueous sodium chloride solution has an Ostwald viscosity in the range of 8 to 60 centipoises at 25° C. The polymer so made may be used as such or it may be partially hydrolyzed by reaction thereof with a sufficient amount of a base, e.g. sodium hydroxide, to hydrolyze a portion of the amide groups present in the polymer molecule. Hydrolysis may occur up to from 20% to 40% of the available amide groups.

Illustrative of monethylenically unsaturated monomers which may be copolymerized with acrylamide to prepare a polymer useful in the practice of the invention and containing up to 10 weight percent of a monomer mixture are any one or more of the following:

vinylbenzylsulphonic acid,
vinylbenzenesulphonic acid,
acrylic and methacrylic acids,
methacrylamide,
allyl alcohol,
vinylpyrridine,
vinylpyrrolididone and
vinyloxazolidinone.

The polymer employed in the practice of the invention is not soluble in the acid treating composition but forms a dispersion wherein the polymer is unformly and minutely dispersed. It is therefore being carried in the treating composition as a suspension and not a solution. It is this phenomenon that gives rise to the fluid-loss properties exhibited by the polymer.

The polymer is employed in a particulate state. The following are illustrative of the recommended limits of sieve analyses of acrylamide polymers useful in the practice of the invention:

| Percent of Polymer Retained on Successive Sieves | Coarser Percent Mesh Grind A Retained | Finer Percent Mesh Grind B Retained |
| --- | --- | --- |
| 40 | 43.8 | 9.7 |
| 60 | 21.3 | 30.2 |
| 100 | 15.6 | 28.7 |
| 140 | 6.1 | 10.3 |
| 200 | 5.5 | 8.4 |
| 325 | 4.6 | 6.4 |
| 325 | 3.1 | 6.3 |

The amount of the polymer to employ is dependent on several conditions of a particular treatment, e.g., upon the porosity of the formation being treated, the fracturing pressure employed, and other conditions peculiar to a given acidizing fracturing operation. Suggested amounts to employ are between about 4 and 100 pounds of the selected acrylamide polymer per 1,000 gallons of the resulting acidizing or acid fracturing fluid. The preferred amount is between about 20 and 60 pounds thereof per thousand gallons. The temperature of the formation or of the fluid being injected is not highly critical. Expressed in weight percent, the amount of polymer which may be employed is between about 0.05 and 1.5 percent and the preferred amount for the practice of the invention is between about 0.25 and 0.75. Any temperature between about 60° and 200° F. results in best performance.

The invention is practiced by admixing with an aqueous acidic liquid, in an acidizing operation, either prior to or while being injected down a wellbore penetrating a hydrocarbonaceous earthen formation, a sufficient amount of the acid-insoluble acrylamide polymer, hereinabove described, to lessen loss of treating liquid to the formation, and continuing to inject the liquid containing the polymer in suspension, either at pressures sufficiently great to fracture or at pressures less than fracturing pressure, in either case to force the aqueous acid into the formation, the polymer thereby being caused to lodge in the larger channels and fissures and thus diverting injected liquid to tighter or less easily penetrated portions of the formation.

The following examples are illustrative of the practice of the invention:

The fluid loss was determined according to the following test. Bedford limestone cores 1″ in diameter and 3″ long were placed in a suitable flexible sleeve of which a Hassler sleeve is illustrative and a differential pressure of 1,000° p.s.i.g. established between the inlet and outlet ends of the core. The Hassler or other sleeve employed is of plastic or rubber which permits entrance and outlet of fluids only through the ends of a core positioned therein. The rubber or plastic sleeve is positioned in a steel case having inlet and outlets provided. Hydraulic pressure is applied circumferentially to the exterior of the rubber or plastic sleeve employing at least twice the pressure that is exerted against the fluid being tested. A reservoir containing the solution to be tested is connected to the inlet end of the case holding the rubber or plastic ensheathed core and a receiver is positioned at the outlet end of the core case. The test is conducted by first pressurizing the reservoir of liquid with nitrogen gas which is used to force the liquid under the desired pressure against the inlet end and thence therethrough.

SERIES 1

Permeability of the cores was ascertained and found to be one millidarcy. The results of the permeability tests of the cores are set out in Table I below.

TABLE I

[Fluid Loss Tests at 1,000 p.s.i.g. Employing 15% by Weight Aqueous HCl Containing 1% by Weight of an Abietic Amine as a Corrosive Inhibitor]

| Lbs. of Polyacrylamide per 1,000 Gal. of Resulting Dispersion | Temperature in Degrees F. | Fluid Loss in Ml— | |
| --- | --- | --- | --- |
| | | In 1 min. | In 25 min. |
| 50 | 80 | 0 | 1.7 |
| 50 | 80 | 0 | 2.2 |
| 50 | 200 | 0.3 | 3.8 |
| 33 | 200 | 0.8 | 4.2 |
| 33 | 200 | 1.0 | 4.6 |
| 25 | 200 | 1.6 | 8.8 |
| 25 | 200 | 0.8 | 5.2 |
| 25 | 200 | 1.2 | 3.0 |
| 25 | 200 | 1.4 | 4.0 |
| 12½ | 200 | 1.2 | 4.2 |
| 6¼ | 200 | 1.0 | 4.8 |
| 25 | 200 | 2.2 | 6.7 |

Reference to Table I shows that excellent results are obtained employing polyacrylamide as the fluid loss inhibitor in 15% hydrochloric acid.

SERIES 2

Series 1 was repeated employing Bedford limestone cores having permeability of 60 millidarcies. The amounts of acrylamide polymer employed and the effect thereof on fluid loss are set out in Table II.

TABLE II

[Fluid Loss Tests at 1,000 p.s.i.g. Employing 15% by Weight Aqueous HCl Containing 1% by weight of an Abietic Amine as a Corrosive Inhibitor]

| Lbs. of Polyacrylamide per 1,000 Gal. of Resulting Dispersion | Temperature in Degrees F. | Fluid Loss in Ml— | |
| --- | --- | --- | --- |
| | | In 1 min. | In 25 min. |
| 25 | 80 | 3.6 | 7.8 |
| 25 | 80 | 3.9 | 6.8 |
| 25 | 80 | 4.6 | 11.2 |
| 50 | 80 | 3.8 | 8.5 |
| 50 | 80 | 2.6 | 6.4 |
| 25 | 200 | 3.1 | 10.4 |
| 25 | 200 | 3.8 | 12.4 |

Reference to Table II shows that satisfactory results are obtained according to the invention employing limestone cores having a permeability of 60 millidarcies.

SERIES 3

This series of tests was run to show the effect, if any, of different sized polyacrylamide.

TABLE III

[Fluid Loss Tests at 1,000 p.s.i.g. Employing 15% by Weight Aqueous HCl Containing 1% by Weight of an Abietic Amine as a Corrosive Inhibitor]

| Grind | Lbs. of Polyacrylamide per 1,000 Gals. of Resulting Dispersion | Temperature in Degrees F. | Fluid Loss in Ml— | |
| --- | --- | --- | --- | --- |
| | | | In 1 min., | In 25 min. |
| Grind A [1] | 25 | 200 | 0.8 | 5.7 |
| Do.[1] | 25 | 200 | 0.7 | 5.2 |
| Grind B [1] | 25 | 200 | 1.6 | 8.8 |
| Do.[1] | 25 | 200 | 0.8 | 5.2 |

[1] Grind A refers to the coarse grind set out in the sieve analyses above; Grind B refers to the fine grind set out in the sieve analyses above.

15% hydrochloric acid was tested through 1 millidarcy permeable limestone cores without the benefit of the polyacrylamide for comparative purposes. In repeated tests, hydrochloric acid all passed through the cores in less than 10 seconds showing an extreme need for an effective fluid loss control agent and also reaffirming that such effective fluids loss agent is provided by employing an acrylamide polymer according to the method of the invention.

SERIES 4

This series of tests was conducted similarly to those above except that Berea sandstone cores were employed instead of limestone. The permeability of the cores was about 100 to 150 millidarcies. The results are shown in Table IV.

TABLE IV

[Fluid Loss Tests at 1,000 p.s.i.g. Employing 15% by Weight Aqueous HCl Containing 1% by Weight of an Abietic Amine as a Corrosive Inhibitor]

| Lbs. of Polyacrylamide per 1,000 Gals. of Resulting Dispersion | Temperature in Degrees F. | Fluid Loss in Ml— | |
|---|---|---|---|
| | | In 1 min. | In Time Stated |
| 25 | 80 | 5 | 10 in 25 min. |
| 25 | 200 | 8 | 66 in 5½ min. |
| 15 | 80 | 10 | 42 in 25 min. |
| 50 | 80 | 10 | 25 in 17 min. |

Reference to Table IV shows that the practice of the invention is effective to lessen fluid loss in sandstone as well as a limestone.

The examples show that an acrylamide polymer dispersed in an aqueous acid solution is highly effective to reduce fluid loss of such acid solution through earthen strata.

Having described my invention, what I desire to claim and protect by Letters Patent is:

1. In a method of treating a subterranean formation penetrated by a well employing an aqueous acid fluid wherein excessive loss of fluid to porous zones of the formation is a problem, the improvement which consists essentially of admixing with an aqueous nonoxidizing acidic fluid prior to the time said fluid comes into contact with said porous zones, a particular linear water-dispersible acid-insoluble acrylamide polymer in an amount of between 0.05 and 1.5 percent by weight, based on the weight of the so-treated aqueous acidic fluid, said polymer selected from the class consisting of polyacrylamide and copolymers of a major proportion of acrylamide and a minor proportion of an ethylenically unsaturated monomer copolymerizable therewith, consisting of vinylbenzylsulphonic acid, vinylbenzenesulphonic acid, acrylic and methacrylic acids, methacrylamide, allyl alcohol, vinylpyrridine, vinylpyrrolidinone and vinyloxazolidinone and injecting the so prepared fluid down the well and into contact with said porous zones.

2. The method according to claim 1 wherein the acrylamide polymer is polyacrylamide.

3. The method according to claim 1 wherein said polymer is prepared by copolymerizing a monomeric mix consisting of at least about 70% acrylamide.

4. The method according to claim 1 wherein the amount by weight of said polymer based on the weight of the so-treated aqueous acidic fluid is between about 0.25 to 0.75%.

5. The method according to claim 1 wherein said fluid is injected at a pressure sufficient to fracture the formation.

References Cited

UNITED STATES PATENTS

| 2,718,497 | 9/1955 | Oldham et al. | 252—8.5 |
| 2,763,326 | 9/1956 | Cardwell et al. | 166—42 |
| 3,153,450 | 10/1964 | Foster et al. | 166—42 |
| 3,252,904 | 5/1966 | Carpenter | 166—42 X |

CHARLES E. O'CONNELL, *Primary Examiner.*

STEPHEN J. NOVOSAD, *Assistant Examiner.*

U.S. Cl. X.R.

166—42

UNITED STATES PATENT OFFICE
CERTIFICATE OF CORRECTION

Patent No. 3,415,319

December 10, 1968

Daniel L. Gibson

It is certified that error appears in the above identified patent and that said Letters Patent are hereby corrected as shown below:

Column 6, line 1, "particular" should read -- particulate --.

Signed and sealed this 24th day of March 1970.

(SEAL)
Attest:

Edward M. Fletcher, Jr.
Attesting Officer

WILLIAM E. SCHUYLER, JR.
Commissioner of Patents